Sept. 27, 1955 C. C. FUERST 2,718,835
HIGH-SPEED LARGE APERTURE PHOTOGRAPHIC SHUTTER MECHANISM
Filed July 28, 1954 4 Sheets-Sheet 1

CARL C. FUERST
INVENTOR.

BY Daniel L. Mayne
Donald H. Stewart

ATTORNEYS.

Sept. 27, 1955  C. C. FUERST  2,718,835
HIGH-SPEED LARGE APERTURE PHOTOGRAPHIC SHUTTER MECHANISM
Filed July 28, 1954  4 Sheets-Sheet 2

CARL C. FUERST
INVENTOR.

BY

ATTORNEYS

Sept. 27, 1955     C. C. FUERST     2,718,835
HIGH-SPEED LARGE APERTURE PHOTOGRAPHIC SHUTTER MECHANISM
Filed July 28, 1954     4 Sheets-Sheet 3

CARL C. FUERST
INVENTOR.

BY

ATTORNEYS

Sept. 27, 1955  C. C. FUERST  2,718,835
HIGH-SPEED LARGE APERTURE PHOTOGRAPHIC SHUTTER MECHANISM
Filed July 28, 1954  4 Sheets-Sheet 4

CARL C. FUERST
INVENTOR.

BY

ATTORNEYS

United States Patent Office 2,718,835
Patented Sept. 27, 1955

2,718,835

HIGH-SPEED LARGE APERTURE PHOTOGRAPHIC SHUTTER MECHANISM

Carl C. Fuerst, Rochester, N. Y., assignor to Eastman Kodak Company, Rochester, N. Y., a corporation of New Jersey Application July 28, 1954, Serial No. 446,241

20 Claims. (Cl. 95—63)

This invention relates to photography and more particularly to large aperture, high-speed shutters which have a range of automatically timed exposures.

The advantages of between-the-lens shutters are well known for hand camera use as well as for aviation camera use. As is well known, when the size of the exposure aperture in a shutter increases, the difficulties of obtaining relatively high speeds and selectively slower speeds greatly increases. While it is customary for a No. 0 size shutter with an opening of perhaps .625 inch to reach speeds of from $\frac{1}{500}$ to $\frac{1}{1000}$ of a second, the next larger size shutter, a No. 1, which has an opening of .705 inch, operates at considerably lower speeds as, for instance, from $\frac{1}{300}$ to $\frac{1}{400}$ of a second slower than the No. 0.

For aviation camera shutters having a many times larger opening, as for instance an opening of 3.50 inches, it has been in the past very difficult to obtain high-speed exposure of much over $\frac{1}{100}$ of a second where slower speeds are also included. However, when only a single high-speed has been employed, mechanisms have been known to produce considerably higher speed exposures. In other words, in shutters having a large exposure aperture, it is a difficult problem to obtain both high speeds and slow speeds and at the same time to provide a shutter which is strong enough to meeet government regulations for durability. In the past, one of the difficulties has been to drive the relatively large shutter blades required at sufficient speed to make a rapid exposure and to stop the rotation of the shutter blades sufficiently gently to prevent the blades from bending or even breaking their drive shafts as the blades suddenly come to rest.

Shock absorbers for hand camera shutters have been frequently used and are, accordingly, not broadly new. One type of shock absorber is shown in my U. S. Patent 2,663,235, High-Speed Shutter, granted December 22, 1953. However, because of a variable power drive, a much more flexible type of shock absorber is desirable for aviation camera shutter or shutters with large apertures.

Since aviation shutters sometimes require a fairly long range of speeds, such as $\frac{1}{25}$, $\frac{1}{50}$, $\frac{1}{100}$, $\frac{1}{200}$ and $\frac{1}{300}$ of a second, it was decided to overcome some of the difficulties mentioned above by providing a very powerful snubber which would bring all of the shutter blades to rest simultaneously without too great of a shock at the higher speeds and to provide a variable drive to assist the shutter mechanism to obtain slower speeds by reducing the power applied for driving the shutter blades. The shock absorber or snubber is designed to successfully snub the slowing up movement of the shutter blades when the minimum power is applied to the blades as well as when the maximum power is applied to the blades. It has been found with such a construction that a large aperture shutter can successfully reproduce a range of speeds such as that set out above.

One object of my invention is to provide a shutter in which one or more springs may be brought into operative relationship with a blade drive ring to apply variable torques to this ring. Another object of my invention is to provide a snubber for engaging the ring which can successfully snub the ring's movement when it is driven by one or more of the power springs to produce different exposures. Still another object of my invention is to provide a snubber in which the snubbing action takes place after the blades have fully opened and which will permit very limited rebound of such an extent that the shutter blades will not open after having once closed. Still another object of my invention is to provide a shutter in which a plurality of drive units is employed and in which a means is provided for drivingly engaging one or more units for various different shutter speeds. Still another object of my invention is to provide a shutter blade drive ring which is definitely latched in a rest position and in a set position and in which the drive ring may move beyond the latch for the rest position and return to it after an exposure is made. A further object of my invention is to provide drive units which may be clutched and unclutched to a drive ring in such a manner that exactly the same teeth of the drive ring and drive unit will always be engaged when the drive units are clutched to the drive ring. Another object of my invention is to provide a drive unit in which a driving pinion is held against rotative movement as it is moved out of mesh with a drive ring gear so as to maintain the drive unit in driving condition at all times. A further object of my invention is to provide a setting means for the drive ring which automatically releases the drive ring latch holding the drive ring in a rest position before starting to turn the drive ring to set the shutter. Still another object of my invention is to provide a multiple power unit drive for a shutter in which a latching mechanism is provided for preventing the adjustment of the drive units except when the parts are in a predetermined position. Other objects will appear from the following specification, the novel features being particularly pointed out in the claims at the end thereof.

Coming now to the drawings wherein like reference characters denote like parts throughout:

In accordance with a preferred embodiment of my invention, the shutter may comprise a mechanism having an exposure aperture of relatively large size. To visualize the size of the shutter, the exposure aperture may be 3½ inches although, of course, the invention can equally well be applied to shutters having larger or smaller exposure apertures. The shutter is preferably of the type in which a ring gear carried by a drive ring moves shutter blades in one direction to make an exposure when the ring gear is moved in one direction, thus turning pinions on each shutter shaft.

The driving ring also includes a ring gear with which one or more movable drive units may coact to vary the torque applied to the drive ring. An adjusting ring which adjusts the shutter for differently timed exposures automatically moves certain of these drive units to and from the ring gear. Each movable drive unit is provided with a latching element which engages a driving pinion before the driving pinion releases the ring gear, thus always holding the drive unit spring at a fixed tension and causing identical teeth to mesh each time the drive unit moves to an operative driving position.

The setting ring may only be adjusted when the shutter parts are at rest and the drive ring may only be set when the parts are in their rest position but unlatched.

A snubber is provided by which a ratchet is moved over a pawl as the exposure blades are brought to rest, thus tensioning a spring which will slow up the drive ring as the blades reach a rest position. This permits a slight rebound of the drive ring but the rebound is controlled to prevent the blades from opening or partially opening and to cause the drive ring to return to a definite latched rest position.

Figure 7:
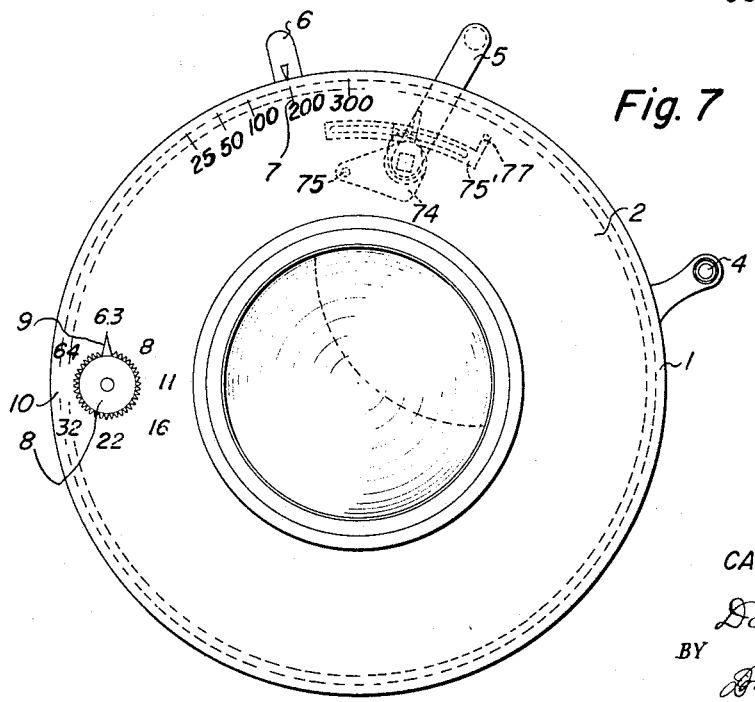
Fig. 7 is a front plan view of a shutter casing and cover which may be used to enclose the shutter mechanism shown in Fig. 1.

More specifically referring to Fig. 7, the shutter consists of a casing 1 on which a cover 2 fits, there being an exposure aperture 3 through these parts through which light passes in making an exposure. The shutter includes a trigger 4 and a setting lever 5. There is a speed control lever 6 movable over the speed control scale 7 and I prefer to provide a knob 8 with a pointer 9 which may be moved over a diaphragm scale 10.

Figure 3:
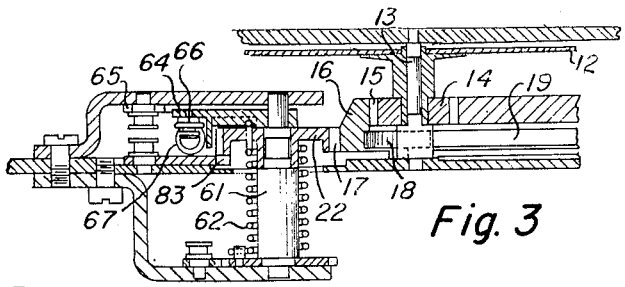
Fig. 3 is a fragmentary detail section on line 3—3 of Fig. 1, this sectional view being schematic, being taken from various angles, in order to better show the relationship of the parts. This section shows a fixed driving element together with its snubber.
Figure 1:
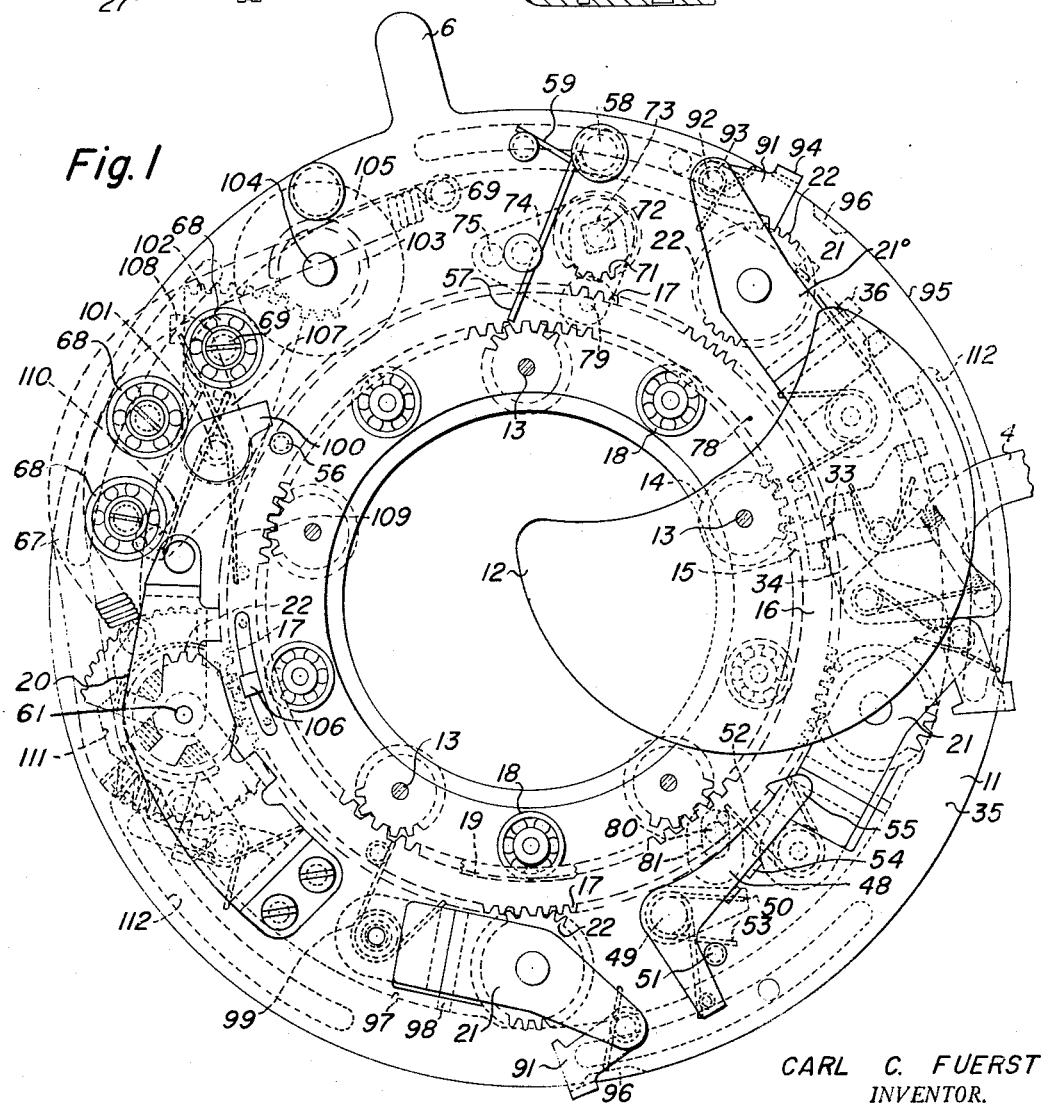
Fig. 1 is a front plan view of a shutter mechanism constructed in accordance with a preferred embodiment of my invention in which the shutter mechanism is removed from a shutter casing and parts are omitted to better illustrate the invention.

Fig. 1 shows the shutter mechanism removed from the shutter casing. Some unessential parts are not shown in this figure. As indicated in this view, a mechanism plate 11 carries most of the mechanism, which will be hereinafter described, and an upper similar mechanism plate spaced therefrom is removed. There are a number of shutter blades 12, only one of which is shown in this figure as being mounted on a shaft 13 carrying a shutter blade pinion 14 meshing with a ring gear 15 of drive ring 16. This drive ring 16 also carries a second ring gear 17. From Fig. 1 it will be noted that there are five spaced shafts 13, each one of which may carry a shutter blade 12. The number of blades is preferably three or five although other numbers of blades may be used according to the particular shape of the shutter blade or other requirements of efficiency of exposure. The drive ring 16 is mounted on a series of ball bearings 18 which, as best shown in Fig. 3, guide the drive ring by a groove 19 in the drive ring 16. Thus, this drive ring may move very freely to move the shutter blades from a rest position covering the exposure aperture 3 to an open position and back to a closed position covering the exposure aperture.

Figure 2:
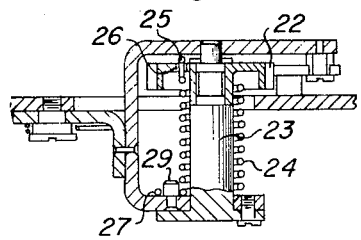
Fig. 2 is a fragmentary detail section taken on line 2—2 of Fig. 1 and showing a typical movable drive unit.

The driving movement of the ring 16 is caused by a fixed drive unit 20 and a number of movable drive units 21, these units being selectively moved into and out of mesh with the ring gear 17. Each drive unit has a drive gear 22 which may be power actuated as indicated in Fig. 2. As here shown, the drive gear 22 is carried by a shaft 23 about which a drive spring 24 is coiled with one end of the spring 25 passing through an aperture 26 in the drive gear and with other end 27 hook shaped at 28, as best illustrated in Figs. 4 and 5, to engage a pin 29.

In some instances the pin 29 may be fixedly carried, as shown in Fig. 2, whereas in other instances the pin 29 may be carried by a ratchet 30 which may be moved to a set position and may be so held by a pawl 31. Thus the power of the adjustable spring units may be varied as for an initial set-up by moving the pin 29 relative to the hook-shaped spring end 28 enabling the spring to move through the angle A before applying a definite torque to the drive shaft 23. This adjustment is preferable on the fixed drive unit, but may be moved on any unit.

Figure 4:
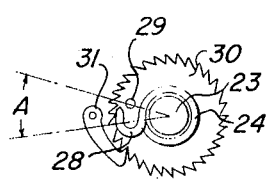
Fig. 4 is a fragmentary section top plan view showing an adjustment for a drive unit by which a torque applied by this drive unit may be varied at will.
Figure 5:
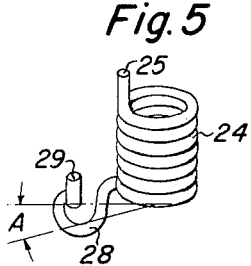
Fig. 5 is a fragmentary perspective view showing the drive spring shown in Fig. 4.

In the present embodiment I have found it sufficient where four drive units are used, as shown, to make only one of these drive units with the adjustable type of spring shown in Figs. 4 and 5. This is preferably mounted on the fixed drive unit. The others can be made with a fixed pin 29, as shown in Fig. 2. While this gives sufficient flexibility to obtain the speeds indicated herein, more flexibility can, of course, be obtained by making each spring unit adjustable.

Figure 6:
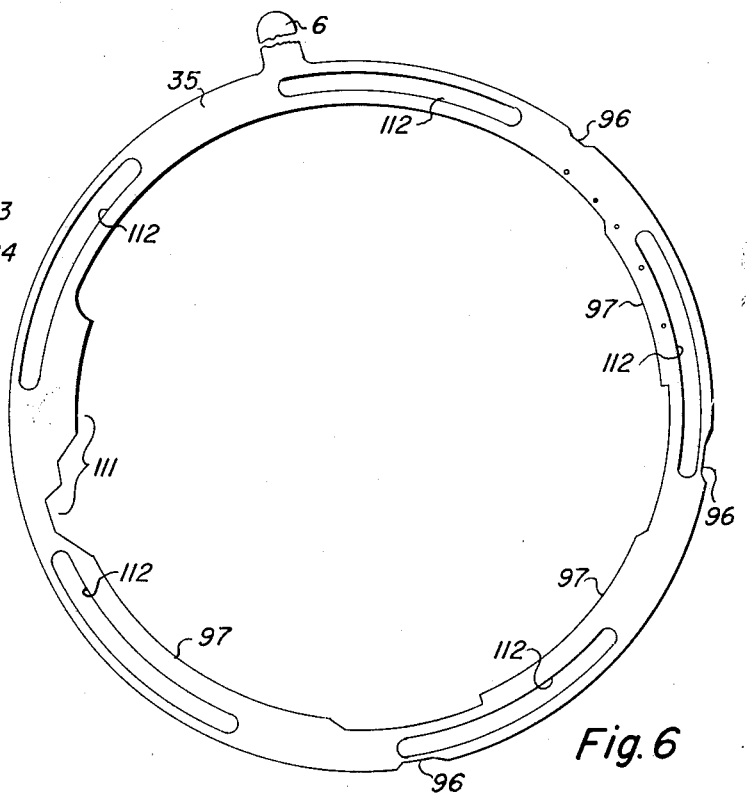
Fig. 6 is a top plan view of a setting ring removed from the camera mechanism shown in Fig. 1.

The shutter mechanism shown in Fig. 1 is set for $\frac{1}{200}$ of a second exposure. With this set-up, three of the drive units are in driving position and one drive unit 21° is out of a driving position and consequently does not contribute to the drive applied to the ring 16 unless a higher speed, $\frac{1}{300}$ of a second exposure is required. The drive ring has a set position, as shown in Fig. 1, in which a lug 33 is engaged by a latch member 34, best shown in Figs. 12 and 13. The lug 33 is carried by the drive ring 16 and, in its latched position, the drive ring lug lies between the latch 34 and a second latch 35' which controls the setting of the speed control ring 35, best shown in Fig. 6.

Figure 12:
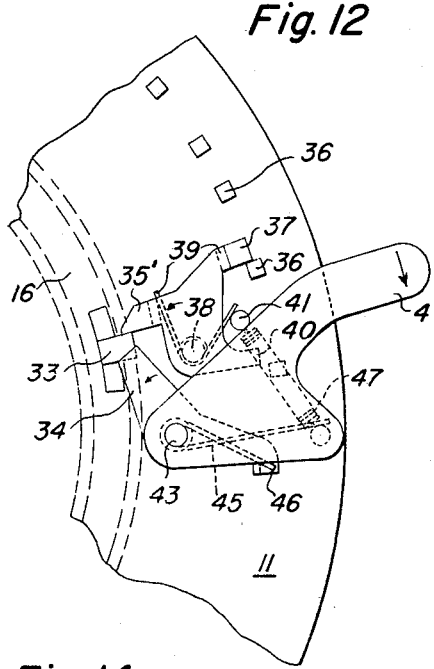
Figure 12 is a fragmentary top plan view of the trigger and latch mechanism which prevent setting the shutter except when the shutter is at rest. The parts are here shown in a setting blocking position.
Figure 13:
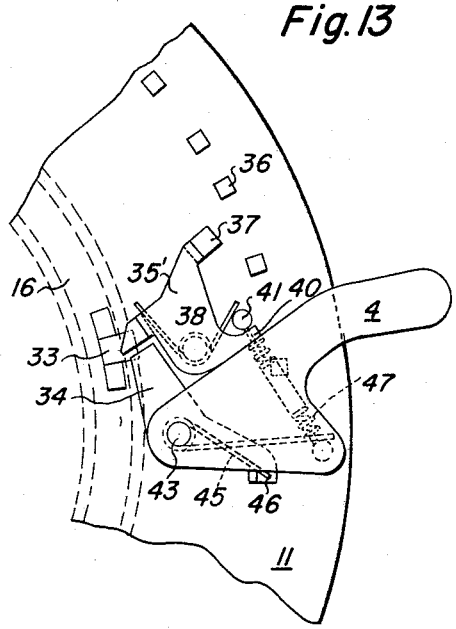
Fig. 13 is like Fig. 12 except that the latching mechanism is shown in its rest position in which the shutter may be set.

This speed control ring includes a number of stop members 36 lying in the path of one arm 37 of the latch 35' which is pivoted at 38 to the mechanism plate and which is pressed by a spring 39 in a counter-clockwise direction so that an arm 40 may strike a stop pin 41. Fig. 12 shows the latch position when the shutter is set, and since the arm 37 lies between the stop members 36, the adjusting ring cannot be turned far enough to change an exposure. However, when the lug 33 has moved from behind the lever 34 (Fig. 13) in making an exposure and reaches the rest position, to be later described, the latch member 35' moves to its inactive position out of the paths of the stops 36 so that the shutter may be again set.

The lever 34 is pivoted on a stud 43 on which the trigger 4 is mounted and a spring 45 tends to turn the lever 34 in a counter-clockwise direction. However, an upturned lug 46 causes the lever to move clockwise when the trigger 4 is moved clockwise against the action of its spring 47, thus releasing the stop 33 and permitting the drive ring 16 to move under the impulse of its motor units.

The drive ring lug 33 moves clockwise from the Fig. 12 position and from the position shown in Fig. 1, swinging down past a latch member 48, which is a rest position latch. Latch 48 is pivoted on a stud 49 and is spring pressed into the position shown in Fig. 1 by a spring 50. A stop pin 51 determines its rest position. There is a second rest latch 52 pivoted on the same pin 49 lying mostly beneath latch 48 and also pressed by its spring 53 so that an upstanding lug 54 carried by latch 52 will engage the latch member 48 and hold it in the position shown. When the drive ring lug 33 moves downwardly relative to Fig. 1, its speed is such that it will strike the hooked end 55 of latch 48 causing it to swing backwardly against its spring moving the second rest latch 52 with it. The drive ring lug moves a short distance beyond the double latch and as this occurs, a pin 56 strikes a spring 57 encircling a stud 58 and resting against a second stud 59, thereby not only assisting in slowing the drive ring 16 but causing the drive ring lug 33 to return to a position in which it will be caught between the rest latch 52 and the hooked end 55 of the latch 48. When this occurs, the parts are latched in a rest position.

However, the snubber means which takes up the major portion of the blow of the rapidly moving drive ring 16 has also acted on the blade drive ring 16 during this movement, as will now be described.

Figure 8:
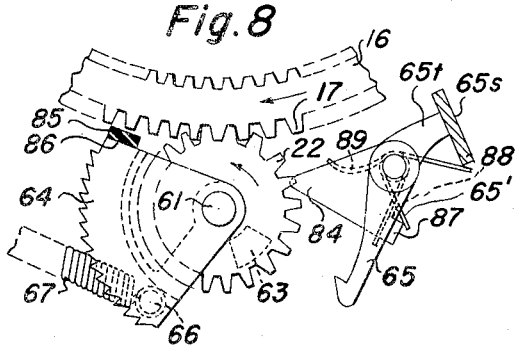
Fig. 8 is a fragmentary detail of a portion of the drive ring and a snubber mechanism, the snubber mechanism being shown in a rest position before an exposure is made.
Figure 10:
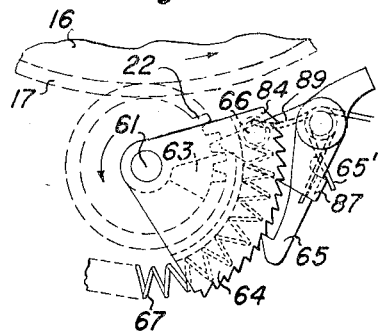
Fig. 10 is a view similar to Fig. 9 showing the snubber mechanism approaching its full extent of movement and positioned to stop the movement of the shutter blades.
Figure 9:
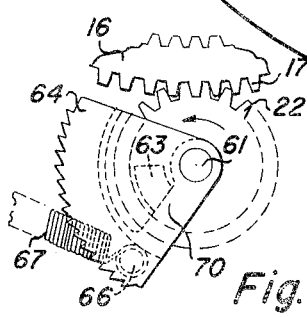
Fig. 9 is a view similar to Fig. 8 but with the snubber mechanism about to start to function after the shutter blades have reached an open position.

Referring to Figs. 1 and 3, a fixed drive unit 20 includes the usual drive gear 22 which meshes with a ring gear 17. The fixed unit is always in mesh and the gear 22 is carried by a shaft 61 surrounded by a drive spring 62 which may act to turn the drive pinion 22 and from it the ring gear 16. In this instance the gear 22 is provided with a lug 63, shown in Fig. 8 in its rest position. The shaft 61 movably carries a ratchet 64 and a pawl 65 lies in the path of this ratchet. The ratchet carries a stud 66 to which the end of a long spring 67 is attached, this spring passing over a number of guide rollers, preferably ball bearing rollers, 68 and is attached to a stud 69 carried by the mechanism plate. The action of these parts is as follows: When the drive ring 16 rotates in a clockwise direction, the lug 63 rotates from the rest position in Fig. 8 to the position in Fig. 9 in which it is engaging a downwardly extending arm 70 carried by the ratchet. After the engagement which occurs as indicated in Fig. 9, further movement of the drive pinion 22 causes the ratchet 64 to move elongating the spring 67 and gradually applying a powerful retarding action as the upstanding lug 63 moves the ratchet from the Fig. 9 to the Fig. 10 position in which the ratchet is engaged by the pawl 65. In this position the shutter blades have been brought to rest since the drive ring 16 has been brought to rest, but after reaching this rest position, the blade ring is free to move in a reverse direction a short distance to engage the blade ring lug 33 with the rest position latches 48 and 52 described above. In a preferred embodiment of my invention, spring 67 sustains a 30 lb. pull in elongating as above described. This is purely by way of example. An advantage of this construction is that for lesser torques the ratchet will pass a smaller number of teeth beneath the ratchet.

Figure 14:
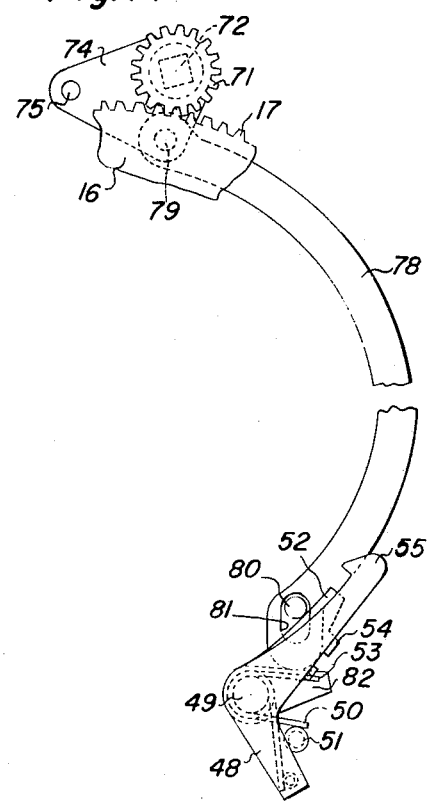
Fig. 14 is a fragmentary top plan view of the shutter latch releasing mechanism which is actuated by the shutter winding device to release the latch holding the shutter drive ring in a rest position just before winding the shutter commences.

With the shutter parts in their rest position and the drive ring lug 33 between the rest position latches 48 and 52, the next step is to rewind the shutter. This is accomplished by the following mechanism. There is a rewind gear 71 carried by a shaft 72 having a squared portion 73. This squared portion may be turned manually by the setting handle 5 shown in Fig. 7, such a handle being particularly useful in trying the shutter before mounting it in a plane. When used in an airplane, it is commonly driven by a motor through a suitable source of power and a one-revolution clutch. In any event, the rotation of the gear 71, when it has meshed with the ring gear 17, sets the shutter. In order to mesh the gear 71 and the ring gear 17, a lever 74 pivoted on a stud 75 may be moved, as by a slide 75' camming the segment 74, to mesh the setting gear 71 and ring gear 17 when moved by the slide handle 77. Of course, when these gears are meshed, they could not be turned (because of rest latches 48 and 52) except for the fact that by moving the lever 74 a releasing lever 78, best shown in Fig. 14, is moved through the pin 79, so that the lever 78 through its pin 80 and slot 81 connection may move downwardly engaging a release lever 82 which is carried by shaft 49 and which consequently rocks the rest latches 48 and 52 away from their operative position. This occurs as the setting gear 71 meshes with the ring gear 17. The setting gear 71 is then turned in a clockwise direction causing the drive ring 16 to move until the drive ring lug 33 reaches and is engaged by the trigger latch 34. This will hold the drive ring in its set position.

It is necessary to release the snubber and this is accomplished toward the end of the setting movement as follows: The drive pinion 22 includes a downwardly extending lug 83, Fig. 3, which moves as the drive ring 16 is moved in a clockwise direction from its Fig. 10 position until the drive pinion 22 has moved substantially one revolution at which time this lug 83 will strike a lever arm 84, thus swinging the pawls 65 away from the ratchet 64 thereby permitting spring 67 to return to its closed or inoperative position shown in Fig. 1. This occurs extremely rapidly, the ratchet swinging until it strikes a stop 85. I prefer to provide a bumper on the latch 85 of a soft or resilient material such as a rubber or leather facing 86, although because of the strength of the spring 67, the shutter still may remain noisy. This can be overcome by providing a simple type of gear retard, not shown, which will be moved by the ratchet as it approaches the rest position.

The pawl 65 has a downwardly extending lug 87 which lies in the path of a similar lug 88 on the lever arm 84. This permits the downwardly extending piece 83 of the drive pinion 22 to swing in an opposite direction moving the lever arm 84 without moving the pawl 65. A spring 89 tends to hold the pawl 65 toward the ratchet. A second spring 65' holds a tail 65$^t$ against a stop flange 65$^s$ carried by the mechanism plate 11.

The movable units such as 21 must be provided with a means for retaining the drive gear 22 in position to mesh with the ring gear 17, this means also holding the gear against turning through the force of its drive spring. Each of the movable drive units therefor is provided with a retaining pawl 91 pivoted to the mechanism plate 11 at 92 and including a spring 93 normally turning the retainer in the direction shown by the arrow. The retainer includes a cam follower 94 in the form of a flange which rides on the periphery 95 of the speed adjusting ring 35 shown in Fig. 6. This periphery is provided with cam notches 96 which are so arranged that when positioned opposite the cam follower 94, the retaining pawl 91 may move inwardly as the pinion 22 is meshed with the ring gear 17 at which time slight further movement of the adjusting ring causes the cam follower to move outwardly to release the drive pinion, as illustrated by the position of the movable driving unit at the bottom of the Figure 1 where the pinion 22 is shown meshed with the ring gear 17 and the retaining pawl 91 is out of mesh with the drive pinion. Thus movement of the adjusting ring 35 by its handle 6 controls the movement of the retaining pawls 91 and in addition the cam surfaces 97, by engaging adjustable pins 98 on the individual drive units 21, move these units into mesh or into an operative position against the action of their springs 99 which tend to move the units out of their operative position. Thus the position of the adjusting ring 35 controls all of the movable driving units and causes the driving pinions to remain in an operative position whether the drive unit is moved into an active position or into an inactive position.

For the slower speeds a retard is used. This retard as best shown in Fig. 1 consists of a retarding lug 100 mounted on a shaft 101 on which a gear segment 102 is mounted, this gear segment meshing with the pinion 103 turning on shaft 104 carrying a weight 105. The position of the gear segment 102 controls the amount of engagement between a slow speed lug 106 on the drive ring 16 as it moves in a clockwise direction in making an exposure. Lug 106 is positioned to engage the retarding lug 100 as the blades reach a fully open position and riding past the lug 100 to release the retarding action. The lug 106 may move in a reverse direction because the retarding lug 109 is carried by a lever 107, and gear segment 102 has a lug 108 lying in the path of lever 107. The lever 107 is spring pressed by a spring 109 so that in moving setting lever 107 may move without moving the gear segment. The position of the gear segment 102 is controlled by a pin 110 spring pressed by spring 111 into engagement with cams 97 of speed adjusting ring 35. The slots 112 are to slide on connecting shaft 113, Fig. 11, to guide the speed adjusting ring.

Since with this type of shutter the shutter blades 32 open and close while moving in one direction, they also open and close when the shutter is set. To prevent light from entering during this movement, cover blades 115 and 116 are pivoted on studs 117 and 118, there being a slot 119 encircling the last-mentioned stud. Each blade includes a slot 120 and 121 which pass about a pin 122 extending upwardly from a lever 123. This lever is pivotally attached to a pin 124 carried by the shutter trigger 4, the parts being so arranged that the first part of the movement of the trigger 4 opens the cover blades 115 and 116 and retains them in an open position while the exposure is being made.

Figure 11:
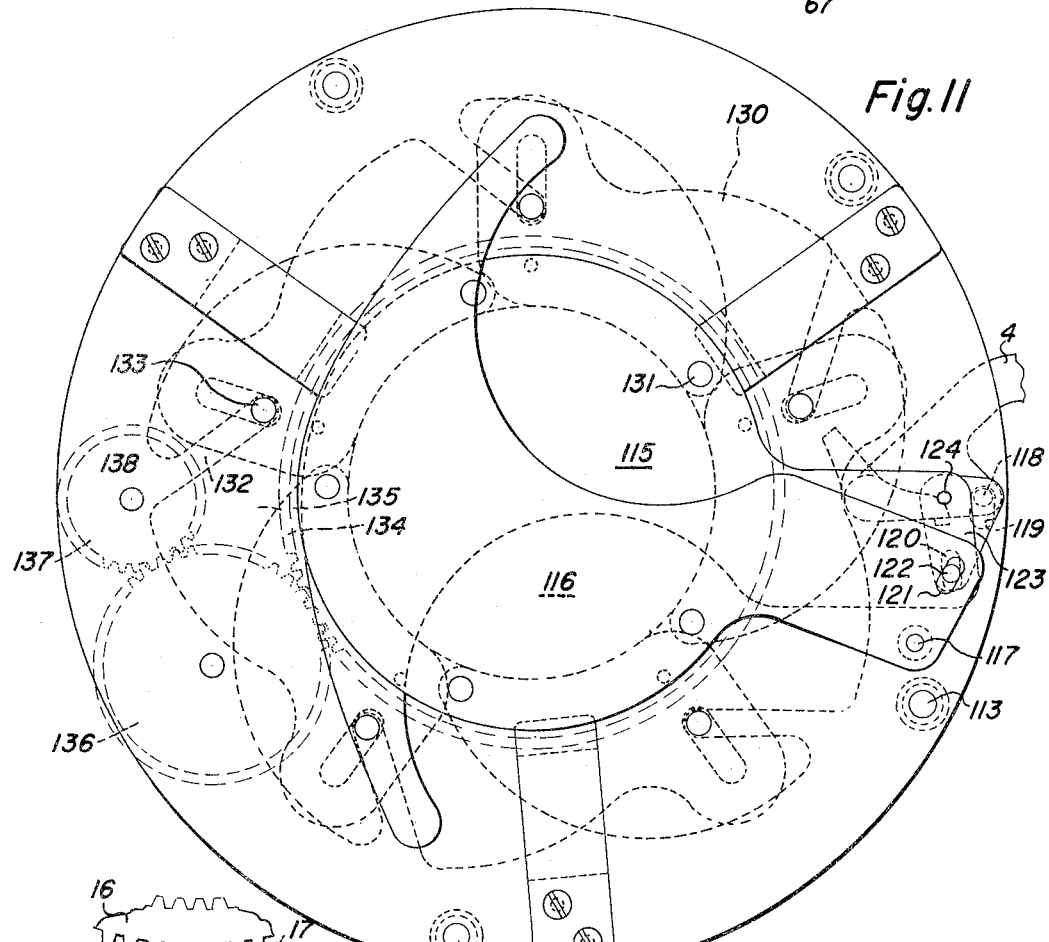
Fig. 11 is a top plan view showing parts of the shutter mechanism including the cover blades and the diaphragm leaf mechanism together with their adjusting gear.

The diaphragm mechanism, also shown in Fig. 11, may include a series of diaphragm leaves 130, these leaves being pivoted at 131 to the shutter casing and having cam slots 132 engaging pins 133 carried by the diaphragm leaves at the opposite ends so that a ring gear 134 which carries the adjusting ring 135 may open or close the diaphragm through the gear 136, pinion 137 and a knob 8, best shown in Fig. 7, which is mounted on a shaft 138 carrying the pinion 137. Any known type of diaphragm may be used.

I have described a specific and preferred embodiment of my invention in which the several objects of this invention are achieved and which is well adapted to meet the conditions of practical use.

As various possible embodiments may readily be made and as various changes may be made in the embodiments above set forth, it is to be understood that all matter herein set forth or shown in the accompanying drawings is to be interpreted as illustrative only and not in a limiting sense.

I claim:

1. A camera shutter comprising an apertured support, a ring extending around the aperture in the support, means for setting and releasing the ring, two sets of teeth on the ring forming a first and a second ring gear thereon, a plurality of shafts spaced about the aperture, a shutter blade carried by each shaft, a pinion carried by each shaft for moving the shutter blades together to open and close the aperture, said pinions meshing with teeth on the first ring gear, power units including power pinions adapted to mesh with teeth on the second ring gear, a power spring acting on each power pinion, a ratchet pivoted adjacent a power pinion, a ratchet spring normally holding the ratchet against a stop, a contact carried by the ratchet, a lug carried by a power pinion positioned to move to engage and move the ratchet contact, a pawl pivotally mounted and positioned to engage the ratchet teeth as the lug on the power pinion engages and moves the contact carried by the pinion and moves the ratchet against its spring, the relationship of the shutter blade pinions, the power pinions and the ring gears being selected to engage the pawl and ratchet and tension the ratchet spring as the shutter blades are closing the aperture towards the end of an exposure making movement to cushion the closing movement thereof.

2. The camera shutter defined in claim 1 characterized in that the ratchet pivoted adjacent the power pinion is also coaxially pivoted with respect thereto.

3. The camera shutter defined in claim 1 characterized in that the contact and the lug have a rest position spaced approximately 270° from each other whereby the latter does not engage and move the former until it has moved a large portion of a revolution at which time it may strike and move the contact and ratchet into contact with the pawl to cause the shutter blades to decelerate rapidly as they close the exposure aperture.

4. The camera shutter defined in claim 1 characterized in that the contact and the lug have a rest position spaced approximately 270° from each other whereby the latter does not engage and move the former until it has moved a large portion of a revolution at which time it may strike and move the contact and ratchet into contact with the pawl to cause the shutter blades to decelerate rapidly as they close the exposure aperture and characterized in that there is an extension carried by the power pinion, and a pawl lever positioned to move the ratchet and to lie in the path of the extension whereby the latter may, when moved to one position, move the pawl from the ratchet permitting the ratchet spring to return the ratchet to a rest position.

5. A camera shutter comprising an apertured support, a drive ring extending around the aperture carrying two sets of teeth forming a first and a second ring gear, a plurality of power springs carried by the support, a plurality of power pinions each attached to one end of one of said springs, a movable bracket carrying a power pinion mounted for movement to mesh and unmesh with the second ring gear, a speed setting plate movable to mesh and unmesh the power pinion and the second ring gear, a plurality of shutter leaves each pivotally mounted about the aperture, a pinion on each shutter leaf pivot, gear teeth on the first ring gear meshing with the shutter blade pinions for driving the blades together, at least one power driven pinion having a fixed relation in mesh with the second ring gear, a snubber coacting with the drive pinion including a ratchet coaxially pivoted relative to the ratchet, a lug on the drive pinion, a contact on the ratchet positioned to be engaged by and moved with the lug, a pawl pivotally mounted on the support and positioned to coact with the ratchet when the latter is moved by the coacting lug and contact, and a ratchet spring resisting movement of the ratchet under the coaction of the lug and contact to snub the closing action of the shutter blades driven by the ring gear.

6. The camera shutter defined in claim 5 characterized in that there are a plurality of movable brackets carrying power pinions mounted for movement to mesh and unmesh with the second ring gear, and characterized in that the speed setting plate may move to control the meshing and unmeshing of these power pinions.

7. The camera shutter defined in claim 5 characterized in that there are a plurality of movable brackets carrying power pinions mounted for movement to mesh and unmesh with the second ring gear, and characterized in that the speed setting plate may move to successively control the meshing of one power pinion after another power pinion to vary the power applied to the second ring gear for different exposures.

8. The camera shutter defined in claim 5 characterized in that the pawl is provided with a releasing lever and an extension is provided on the relatively fixed power pinion, the releasing lever being engageable by the extension on the relatively fixed power pinion to release the pawl from the ratchet.

9. The camera shutter defined in claim 5 characterized in that there is an extension on the power pinion fixedly in mesh with the second ring gear, and a releasing device lying in the path of the extension, and in which there is a means for setting the ring gear by reversing its direction of movement and winding the power pinions and their springs and a means for latching the ring gear in a set position, said extension on the power spring pinion coacting with the pawl only when the ring gear is moved to a substantially set position.

10. The camera shutter defined in claim 5 characterized in that there is an extension on the power pinion fixedly in mesh with the second ring gear, and a releasing device lying in the path of the extension, and in which there is a means for setting the ring gear by reversing its direction of movement and winding the power pinions and their springs and a means for latching the ring gear in a set position, said extension on the power spring pinion coacting with the pawl only when the ring gear is moved to a substantially set position, whereby said ratchet may return to a rest position in which the extension and releasing device are spaced apart, said releasing device including a latch member movable idly without moving the pawl when engaged by the extension moving in one direction, said latch member moving the pawl when the extension moves in a reverse direction.

11. A snubber mechanism for shutters including an apertured support, shutter leaves movably mounted to open and close the aperture in the support, means coacting with the shutter leaves and moving said leaves through a cycle to make an exposure, and including a pivoted member movable through approximately one revolution, said snubber including a ratchet coaxially positioned adjacent the pivoted member, a spring normally holding the ratchet against a stop, a lug carried by the pivoted member, a contact on the ratchet lying in the path of movement of the lug, said stop normally positioning the ratchet contact spaced from the lug when in a normal position of rest, the lug striking and moving the ratchet by its contact thereby increasingly tensioning the ratchet spring and a pawl swingably mounted on a fixed pivot and lying in the path of the ratchet for engaging the teeth thereof to hold the ratchet against returning movement and to bring the shutter leaves to rest and to prevent reopening of the blades after an exposure has been completed.

12. The snubber mechanism for shutters as defined in claim 11 characterized in that there is a release for releasing the pawl operable by an extension carried by the pivoted member.

13. The snubber mechanism for shutters as defined in claim 11 characterized in that there is a means for setting and releasing the pivoted member for moving between a set and a released position, and characterized in that there is a release for releasing the pawl operable by an extension carried by the pivoted member as said member approaches its set position.

14. A camera shutter comprising an apertured support, a ring gear movably mounted on and extending around the aperture, a plurality of drive units each including a pinion, a shaft, and a spring tending to turn the shaft in one direction carried by a movable bracket, and means for swinging the bracket to mesh and unmesh the power operated pinion and ring gear, and at least one drive unit comprising a pinion permanently meshing with the ring gear, and a power spring therefor, and means carried by each movable power unit for holding the power unit against movement by its spring when said unit is moved to unmesh its gear from the ring gear, the permanently meshing power operated pinion including means for coacting with a snubber for decelerating the ring gear.

15. A camera shutter comprising an apertured support, a ring gear movably mounted on and extending around the aperture, a plurality of drive units each including a pinion, a shaft, and a spring tending to turn the shaft in one direction carried by a movable bracket, and means for swinging the bracket to mesh and unmesh the power operated pinion and ring gear, and at least one drive unit comprising a pinion permanently meshing with the ring gear, and a power spring therefor, and means carried by each movable power unit for holding the power unit against movement by its spring when said unit is moved to unmesh its gear from the ring gear, the permanently meshing power operated pinion including means for coacting with a snubber for decelerating the ring gear, said means comprising a gear tooth engaging member positioned to engage a tooth of the movable power drive unit pinion as said pinion is unmeshed from the ring gear.

16. A camera shutter comprising an apertured support, a drive ring extending around the aperture, a ring gear carried by the drive ring, a plurality of power spring operated units, each including a bracket, a spring and a power driven pinion, one power driven unit having the pinion always in mesh with the ring gear, a plurality of power driven units being movably mounted to move from a position in which the pinion meshes with the ring gear to a position in which they are out of mesh, means carried by the shutter for immobilizing the pinion before the pinion becomes unmeshed with the ring gear, and a settable member engageable with the movable power driven units for controlling the position of the units with respect to the ring gear.

17. A camera shutter comprising an apertured support, a drive ring extending around the aperture, a ring gear carried by the drive ring, a plurality of power spring operated units, each including a bracket, a spring and a power driven pinion, one power driven unit having the pinion always in mesh with the ring gear, a plurality of power driven units being movably mounted to move from a position in which the pinion meshes with the ring gear to a position in which they are out of mesh, a latch for immobilizing the ring gear and means for preventing movement of the settable member except when said latch is in an operative position.

18. A camera shutter comprising an apertured support, a drive ring extending around the aperture, a ring gear carried by the drive ring, a plurality of power spring operated units, each including a bracket, a spring and a power driven pinion, one power driven unit having the pinion always in mesh with the ring gear, a plurality of power driven units being movably mounted to move from a position in which the pinion meshes with the ring gear to a position in which they are out of mesh, means carried by the shutter for immobilizing the pinion before the pinion becomes unmeshed with the ring gear, and a settable member engageable with the movable power driven units for controlling the position of the units with respect to the ring gear, a shutter setting member including a setting pinion, means for turning the pinion, means for moving the pinion to and from meshing position with respect to the second ring gear, a ring gear latch for holding the ring gear in a rest position, and coacting elements forming a ring gear latch releasing device operable when said setting pinion is moved toward a meshing position with the second ring gear.

19. A camera shutter comprising an apertured support, a drive ring extending around the aperture, a ring gear carried by the drive ring, a plurality of power spring operated units, each including a bracket, a spring and a power driven pinion, one power driven unit having the pinion always in mesh with the ring gear, a plurality of power driven units being movably mounted to move from a position in which the pinion meshes with the ring gear to a position in which they are out of mesh, means carried by the shutter for immobilizing the pinion before the pinion becomes unmeshed with the ring gear, and a settable member engageable with the movable power driven units for controlling the position of the units with respect to the ring gear, a movable setting member for setting the time of an exposure, a setting member latch element, protuberances on the setting member corresponding to certain exposure times movable to positions in one of which a protuberance may be adjacent the setting member latch, and means carried by the shutter and coacting with the drive ring for holding the setting member against sufficient movement to change the shutter speed when the drive ring moves from its rest position towards a set position.

20. A camera shutter comprising an apertured support, a drive ring extending around the aperture, a ring gear carried by the drive ring, a plurality of power spring operated units, each including a bracket, a spring and a power driven pinion, one power driven unit having the pinion always in mesh with the ring gear, a plurality of power driven units being movably mounted to move from a position in which the pinion meshes with the ring gear to a position in which they are out of mesh, means carried by the shutter for immobilizing the pinion before the pinion becomes unmeshed with the ring gear, and a settable member engageable with the movable power driven units for controlling the position of the units with respect to the ring gear, a latch for holding the drive ring in a set position, a trigger for releasing the latch, a second ring gear carried by the drive ring, a setting pinion movable to and from the second ring gear for setting the drive ring, a drive ring latch for holding the drive ring against movement when in a rest or unset position, and a drive ring latch releasing arm, movable with the setting pinion for releasing the drive ring in advance of setting the drive ring by the drive ring gear setting pinion, and means for turning the setting ring pinion to set the ring when the setting pinion and the second ring gear are in mesh.

No references cited.